United States Patent
Davis et al.

(10) Patent No.: US 11,827,338 B2
(45) Date of Patent: Nov. 28, 2023

(54) AIRCRAFT CONTROL SURFACE WITH LINEAR ACTUATOR

(71) Applicant: Rohr, Inc., Chula Vista, CA (US)

(72) Inventors: Jennifer Davis, La Jolla, CA (US); Karl Potier, Paris (FR); Jerome Socheleau, Vernouillet (FR); Raphael Medina, Ecouen (FR)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/671,097

(22) Filed: Feb. 14, 2022

(65) Prior Publication Data
US 2023/0257107 A1    Aug. 17, 2023

(51) Int. Cl.
*B64C 13/40*    (2006.01)
*B64C 9/00*    (2006.01)

(52) U.S. Cl.
CPC ........ *B64C 13/40* (2013.01); *B64C 2009/005* (2013.01)

(58) Field of Classification Search
CPC ........... B64C 9/02; B64C 13/36; B64C 13/40; B64C 2009/005
See application file for complete search history.

(56) References Cited

U.S. PATENT DOCUMENTS

| 2,927,469 | A | | 3/1960 | Czerwinski |
| 4,595,158 | A | | 6/1986 | Robinson |
| 4,773,620 | A | * | 9/1988 | Seidel ........................ B64C 3/50 244/99.2 |
| 2017/0130764 | A1 | * | 5/2017 | Yasui ........................ F16C 7/026 |
| 2018/0141636 | A1 | | 5/2018 | Currie |
| 2020/0080588 | A1 | | 3/2020 | Yasui |
| 2021/0061443 | A1 | | 3/2021 | Dahl |
| 2021/0114714 | A1 | | 4/2021 | Tsai |

OTHER PUBLICATIONS

EP search report for EP23156649.8 dated Jun. 26, 2023.

* cited by examiner

*Primary Examiner* — Richard G Davis
(74) *Attorney, Agent, or Firm* — GETZ BALICH LLC (57) ABSTRACT

An assembly is provided for an aircraft. This aircraft assembly includes an aircraft control surface. The aircraft control surface includes a first skin, a second skin and a support structure laterally between and connected to the first skin and the second skin. The support structure includes a spar, a first stiffener and a second stiffener. The spar extends spanwise within the aircraft control surface. The first stiffener extends longitudinally within the aircraft control surface to the spar. The second stiffener extends longitudinally within the aircraft control surface to the spar. An actuator receptacle projects longitudinally into the aircraft control surface from a base of the aircraft control surface to the spar. The actuator receptacle extends spanwise within the aircraft control surface between the first stiffener and the second stiffener.

20 Claims, 5 Drawing Sheets

AIRCRAFT CONTROL SURFACE WITH LINEAR ACTUATOR

BACKGROUND

1. Technical Field

This disclosure relates generally to an aircraft and, more particularly, to an aircraft control surface.

2. Background Information

An aircraft includes multiple control surfaces (sometimes referred to as flight control surfaces) for controlling aircraft flight. Various types and configurations of aircraft control surfaces and actuators for moving these aircraft control surfaces are known in the art. While these known aircraft control surfaces and actuators have various benefits, there is still room in the art for improvement. There is a need in the art, for example, for more compact aircraft control surfaces and/or airfoils to which the aircraft control surfaces are connected.

SUMMARY OF THE DISCLOSURE

According to an aspect of the present disclosure, an assembly is provided for an aircraft. This aircraft assembly includes an aircraft control surface. The aircraft control surface includes a first skin, a second skin and a support structure laterally between and connected to the first skin and the second skin. The support structure includes a spar, a first stiffener and a second stiffener. The spar extends spanwise within the aircraft control surface. The first stiffener extends longitudinally within the aircraft control surface to the spar. The second stiffener extends longitudinally within the aircraft control surface to the spar. An actuator receptacle projects longitudinally into the aircraft control surface from a base of the aircraft control surface to the spar. The actuator receptacle extends spanwise within the aircraft control surface between the first stiffener and the second stiffener.

According to another aspect of the present disclosure, another assembly is provided for an aircraft. This aircraft assembly includes an aircraft control surface, a first actuation apparatus and a second actuation apparatus. The aircraft control surface extends spanwise between a first end and a second end. The aircraft control surface extends longitudinally between a base and a tip. The aircraft control surface extends laterally between a first side and a second side that meets the first side at the tip. The aircraft control surface includes a first actuator receptacle and a second actuator receptacle. Each of the first actuator receptacle and the second actuator receptacle projects partially longitudinally into the aircraft control surface from the base. Each of the first actuator receptacle and the second actuator receptacle extends spanwise within the aircraft control surface. Each of the first actuator receptacle and the second actuator receptacle extends laterally within the aircraft control surface. The first actuation apparatus is mated with the first actuator receptacle and pivotally connected to the aircraft control surface. The second actuation apparatus is mated with the second actuator receptacle and pivotally connected to the aircraft control surface.

According to still another aspect of the present disclosure, another assembly is provided for an aircraft. This aircraft assembly includes an aircraft base structure, an aircraft control surface and an actuation apparatus. The aircraft control surface is pivotally attached to the aircraft base structure at a control surface pivot axis. The actuation apparatus includes a linear actuator and a linkage. A first end of the linear actuator is pivotally attached to the aircraft control surface at an actuator pivot axis, where the actuator pivot axis is recessed into the aircraft control surface from the control surface pivot axis. A second end of the linear actuator is pivotally attached to the linkage at a linkage pivot axis. The linkage may move relative to the aircraft base structure and the aircraft control surface during operation of the actuation apparatus.

The aircraft control surface may also include a first skin, a second skin, a spar, a first stiffener and a second stiffener. The spar may extend spanwise within the aircraft control surface. The first stiffener may extend longitudinally within the aircraft control surface to the spar. The second stiffener may extend longitudinally within the aircraft control surface to the spar. The first actuator receptacle may be formed by the spar, the first stiffener and the second stiffener laterally between the first skin and the second skin.

The actuator receptacle may extend laterally within the aircraft control surface between the first skin and the second skin.

The aircraft assembly may also include an actuator mount disposed within the actuator receptacle and connected to the aircraft control surface.

The actuator mount may be connected to the spar.

The actuator mount may be connected to the first skin and/or the second skin.

The aircraft assembly may also include a linear actuator disposed in the actuator receptacle and pivotally attached to the actuator mount.

The aircraft assembly may also include a control surface mount connected to the support structure. A pivot axis of the actuator mount may be longitudinally offset from a pivot axis of the control surface mount.

The pivot axis of the actuator mount may also be laterally offset from the pivot axis of the control surface mount.

The aircraft assembly may also include a linear actuator disposed in the actuator receptacle and pivotally attached to the aircraft control surface.

The linear actuator may be configured as or otherwise include a hydraulic actuator.

The aircraft assembly may also include an aircraft base structure. The aircraft control surface may be pivotally attached to the aircraft base structure at a first pivot axis. The linear actuator may be pivotally attached to the aircraft control surface at a second pivot axis that is recessed into the aircraft control surface from the first pivot axis.

The aircraft assembly may also include an aircraft base structure. The aircraft control surface may be pivotally attached to the aircraft base structure at a first pivot axis. The linear actuator may be pivotally attached to the aircraft control surface at a second pivot axis that is longitudinally and laterally offset from the first pivot axis.

The support structure may also include a third stiffener and a fourth stiffener. The third stiffener may extend longitudinally within the aircraft control surface to the spar. The fourth stiffener may extend longitudinally within the aircraft control surface to the spar. A second actuator receptacle may project longitudinally into the aircraft control surface from the base to the spar. The second actuator receptacle may extend spanwise within the aircraft control surface between the third stiffener and the fourth stiffener.

The support structure may also include a segmented spar longitudinally spaced from the spar. The segmented spar may include a first spar segment and a second spar segment spanwise spaced from the first spar segment. The first stiffener may extend longitudinally between the first spar segment and the spar. The second stiffener may extend longitudinally between the second spar segment and the spar.

The support structure may also include a second spar longitudinally between the spar and a tip of the aircraft control surface.

The aircraft control surface may be configured as or otherwise include an aileron. Alternatively, the aircraft control surface may be configured as or otherwise include an elevator, a flap, a rudder or any other flight control surface.

The aircraft control surface may be constructed from or otherwise include fiber-reinforced composite material.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
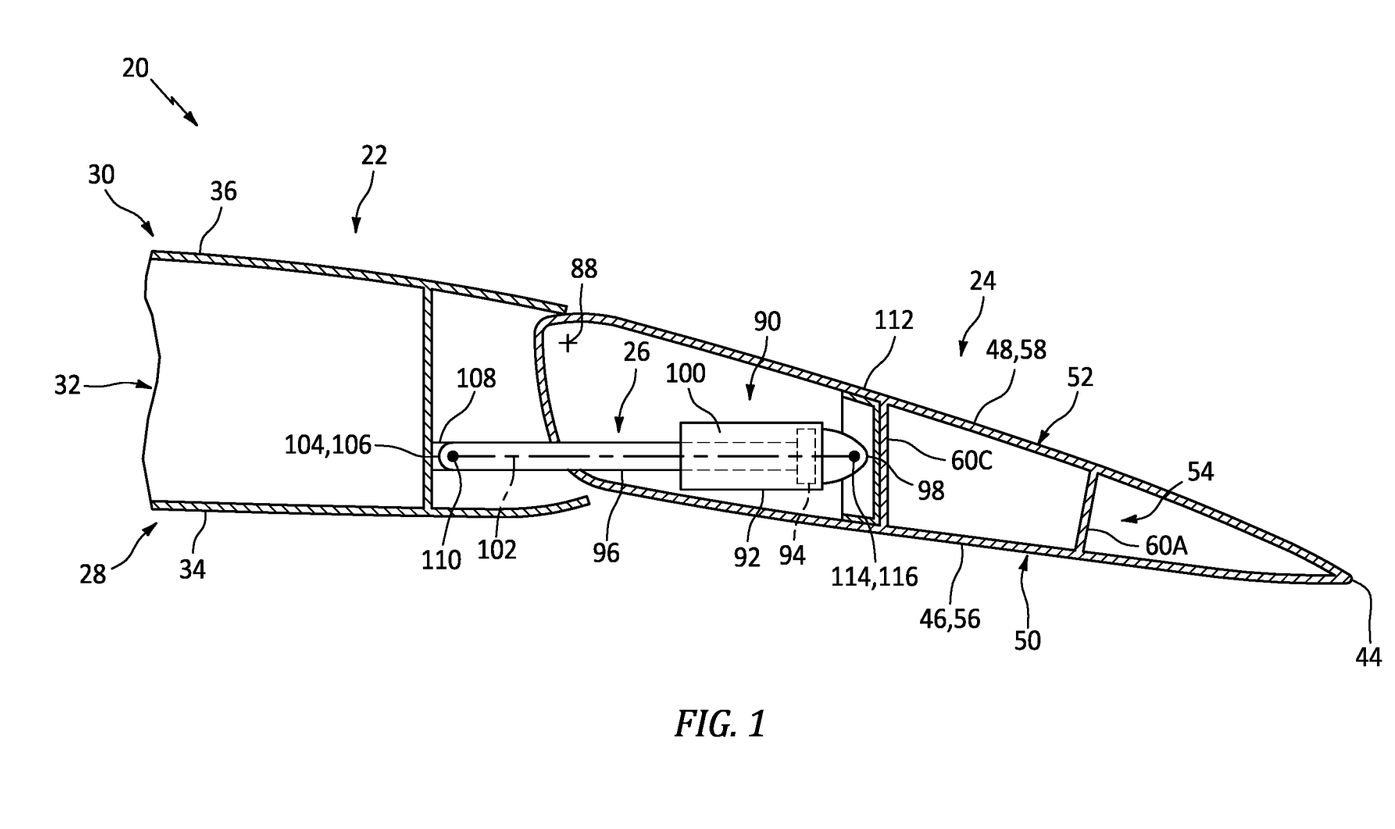
FIG. 1 is a side sectional illustration of a portion of an aircraft assembly.

FIG. 1 illustrates an assembly 20 for an aircraft such as, but not limited to, an airplane. The aircraft assembly 20 includes a stationary aircraft base structure 22 and a moveable aircraft control surface 24, which may also be referred to as a flight control surface. The aircraft assembly 20 also includes one or more actuation apparatuses 26 (one depicted in FIG. 1; see also FIG. 2) configured to move (e.g., pivot) the aircraft control surface 24 relative to the aircraft base structure 22.

The aircraft base structure 22 may be configured as an airfoil for the aircraft. The aircraft base structure 22 of FIG. 1, for example, is configured as an aircraft wing. The present disclosure, however, is not limited to such an exemplary aircraft base structure. The aircraft base structure 22, for example, may alternatively be configured as a horizontal stabilizer, a vertical stabilizer or any other member of the aircraft supporting an aircraft control surface.

The aircraft base structure 22 of FIG. 1 includes an exterior bottom skin 28, an exterior top skin 30 and an internal support structure 32. The base structure bottom skin 28 forms an exterior bottom aerodynamic flow surface 34 of the aircraft base structure 22. The base structure top skin 30 forms an exterior top aerodynamic flow surface 36 of the aircraft base structure 22. The base structure support structure 32 is arranged between the base structure bottom skin 28 and the base structure top skin 30. This base structure support structure 32 provides an internal rigid frame supporting the base structure bottom skin 28 and the base structure top skin 30. The base structure support structure 32 of FIG. 1 extends laterally between and is connected to the base structure bottom skin 28 and the base structure top skin 30. This base structure support structure 32 may include one or more internal spars, one or more internal stiffeners and/or one or more other structural members.

The aircraft control surface 24 is an aerodynamic body configured to adjust, maintain and/or otherwise control one or more flight parameters; e.g., altitude, pitch, roll, etc. The aircraft control surface 24 of FIG. 1, for example, is configured as an aileron. The present disclosure, however, is not limited to such an exemplary aircraft control surface. The aircraft control surface 24, for example, may alternatively be configured as an elevator, a flap, a rudder or any other flight control surface.

Figure 2:
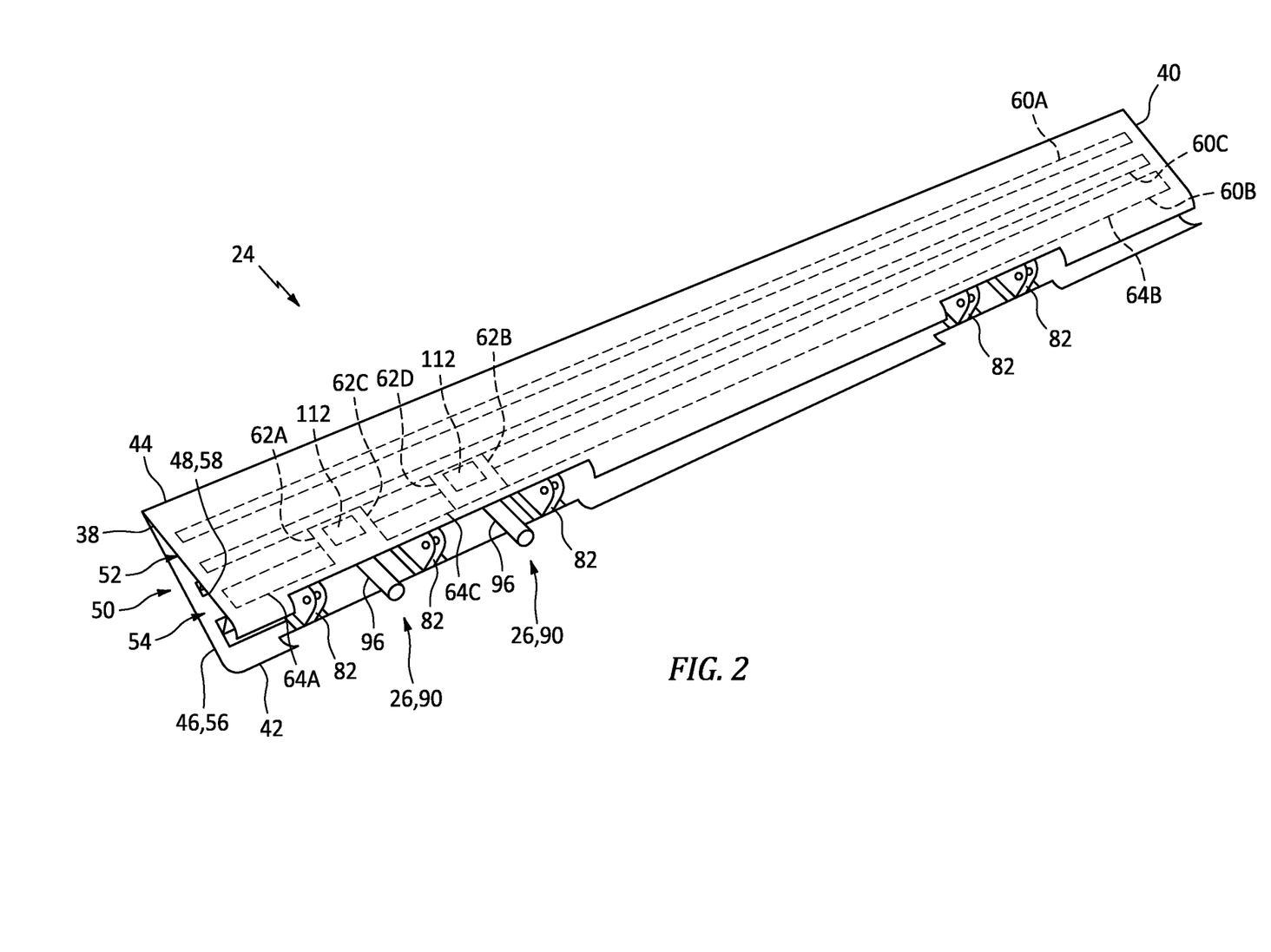
FIG. 2 is a perspective illustration of an aircraft control surface for the aircraft assembly configured with multiple actuation apparatuses partially shown.

Referring to FIG. 2, the aircraft control surface 24 extends spanwise along a span line between and to a first end 38 of the aircraft control surface 24 and a second end 40 of the aircraft control surface 24. The aircraft control surface 24 extends longitudinally along a chamber line between and to a base 42 of the aircraft control surface 24 and a tip 44 (e.g., a trailing edge) of the aircraft control surface 24. The aircraft control surface 24 extends laterally between and to a bottom side 46 of the aircraft control surface 24 and a top side 48 of the aircraft control surface 24.

The aircraft control surface 24 of FIG. 2 includes a bottom skin 50, a top skin 52 and an internal support structure 54. The control surface bottom skin 50 forms an exterior bottom aerodynamic surface 56 of the aircraft control surface 24 at the control surface bottom side 46. This control surface bottom skin 50 extends spanwise between and to the control surface first end 38 and the control surface second end 40. The control surface bottom skin 50 extends longitudinally between and to the control surface base 42 and the control surface tip 44, where the control surface bottom skin 50 may meet the control surface top skin 52 at the control surface tip 44.

The control surface top skin 52 forms an exterior top aerodynamic surface 58 of the aircraft control surface 24 at the control surface top side 48. This control surface top skin 52 extends spanwise between and to the control surface first end 38 and the control surface second end 40. The control surface top skin 52 extends longitudinally between and to the control surface base 42 and the control surface tip 44.

The control surface support structure 54 is arranged between the control surface bottom skin 50 and the control surface top skin 52. This control surface support structure 54 provides an internal rigid frame supporting the control surface bottom skin 50 and the control surface top skin 52. The control surface support structure 54 of FIG. 2, for example, includes one or more internal spars 60A-C (generally referred to as "60") and one or more internal stiffeners 62A-D (generally referred to as "62").

Each of the support structure elements 60 and 62 may extend laterally between and may engage (e.g., contact) the control surface bottom skin 50 and the control surface top skin 52. Each of the support structure elements 60 and 62 may also be connected to (e.g., formed integral with, or mechanically fastened, bonded and/or otherwise fixedly attached to) the control surface bottom skin 50 and/or the control surface top skin 52. Each of the internal spars 60 of FIG. 2 extends spanwise within the aircraft control surface 24 along the control surface skins 50 and 52, for example between and to (or about) the control surface first end 38 and the control surface second end 40. Each of the internal stiffeners 62 of FIG. 2 extends longitudinally within the aircraft control surface 24 along the control surface skins 50 and 52, for example from (or about) the control surface base 42 towards the control surface tip 44.

Figure 3:
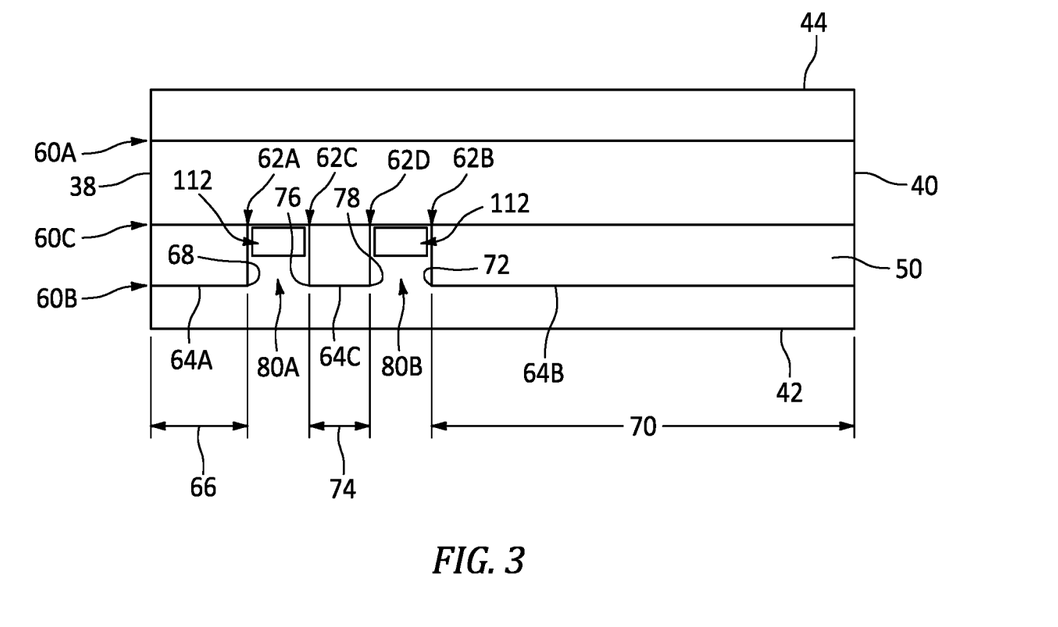
FIG. 3 is a plan view sectional illustration of the aircraft control surface with multiple actuator mounts schematically shown.

Referring to FIG. 3, the tip end spar 60A may be arranged at (e.g., on, adjacent or proximate) and extend spanwise along the control surface tip 44. The base end spar 60B may be arranged at and extend spanwise along the control surface base 42. The intermediate spar 60C is arranged longitudinally between and longitudinally spaced from the tip end spar 60A and the base end spar 60B. The tip end spar 60A and the intermediate spar 60C may each be configured as a continuous spar. Each of the internal spars 60A and 60C of FIG. 3, for example, extends uninterrupted between and to (or about) the control surface first end 38 and the control surface second end 40. The base end spar 60B, by contrast, may be configured as a segmented spar. The base end spar 60B of FIG. 3, for example, includes a plurality of discrete spar segments 64A-C (generally referred to as "64").

The first end spar segment 64A is arranged at the control surface first end 38. The first end spar segment 64A of FIG. 3, for example, extends spanwise a first end spar segment distance 66 from the control surface first end 38 to a second end 68 of the first end spar segment 64A.

The second end spar segment 64B is arranged at the control surface second end 40. The second end spar segment 64B of FIG. 3, for example, extends spanwise a second end spar segment distance 70 from the control surface second end 40 to a first end 72 of the second end spar segment 64B. This second end spar segment distance 70 may be different (e.g., greater) than the first end spar segment distance 66. The second end spar segment distance 70, for example, may be between two times (2×) and ten times (10×) greater than the first end spar segment distance 66. The present disclosure, however, is not limited to such an exemplary dimensional relationship. For example, in other embodiments, the second end spar segment distance 70 may be less than two times greater than the first end spar segment distance 66, or more than ten times greater than the first end spar segment distance 66.

The intermediate spar segment 64C is arranged spanwise between the first end spar segment 64A and the second end spar segment 64B. The intermediate spar segment 64C of FIG. 3, for example, extends spanwise an intermediate spar segment distance 74 from a first end 76 of the intermediate spar segment 64C to a second end 78 of the intermediate spar segment 64C. This intermediate spar segment distance 74 may be different (e.g., less) than the first end spar segment distance 66 and/or the second end spar segment distance 70. The intermediate spar segment distance 74, for example, may be between one-fifth (⅕) and four-fifths (⅘) of the first end spar segment distance 66. The present disclosure, however, is not limited to such an exemplary dimensional relationship. For example, in other embodiments, the intermediate spar segment distance 74 may be greater than four-fifths of the first end spar segment distance 66. The intermediate spar segment first end 76 is spanwise spaced from the first end spar segment second end 68. The intermediate spar segment second end 78 is spanwise spaced from the second end spar segment first end 72.

Each of the internal stiffeners 62 of FIG. 3 extends longitudinally (e.g., only or at least) between and to the base end spar 60B and the intermediate spar 60C. The internal stiffener 62A, for example, extends spanwise to and is connected to the first end spar segment 64A at its second end 68. The internal stiffener 62B extends spanwise to and is connected to the second end spar segment 64B at its first end 72. The internal stiffener 62C extends spanwise to and is connected to the intermediate spar segment 64C at its first end 76. The internal stiffener 62D extends spanwise to and is connected to the intermediate spar segment 64C at its second end 78.

Figure 4:
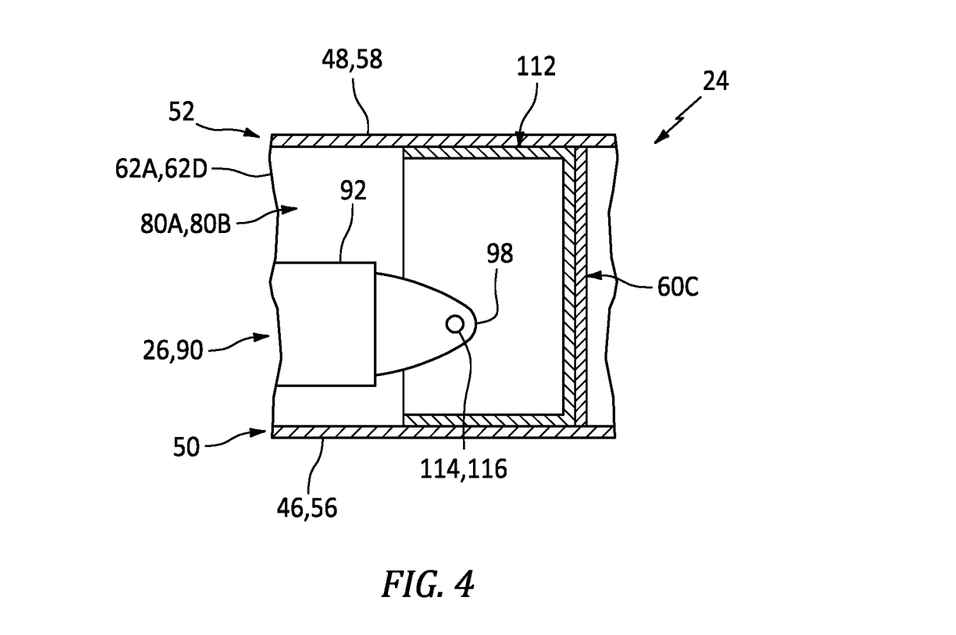
FIG. 4 is a side sectional illustration of a pivot connection between a respective one of the actuation apparatuses and the aircraft control surface.

With the foregoing arrangement, the aircraft control surface 24 is provided with one or more internal actuator receptacles 80A and 80B (generally referred to as "80"). These actuator receptacles 80 are arranged spanwise along the base end spar 60B and the intermediate spar 60C. Each of the actuator receptacles 80 of FIG. 3 projects (e.g., partially) longitudinally into the aircraft control surface 24 from the control surface base 42 (and/or the base end spar 60B) to the intermediate spar 60C. The actuator receptacle 80A extends spanwise within the aircraft control surface 24 between and to the spanwise opposing internal stiffeners 62A and 62C. The actuator receptacle 80B extends spanwise within the aircraft control surface 24 between and to the spanwise opposing internal stiffeners 62B and 62D. Referring to FIG. 4, each of the actuator receptacles 80 extends laterally between and to the control surface bottom skin 50 and the control surface top skin 52.

Figure 5A:
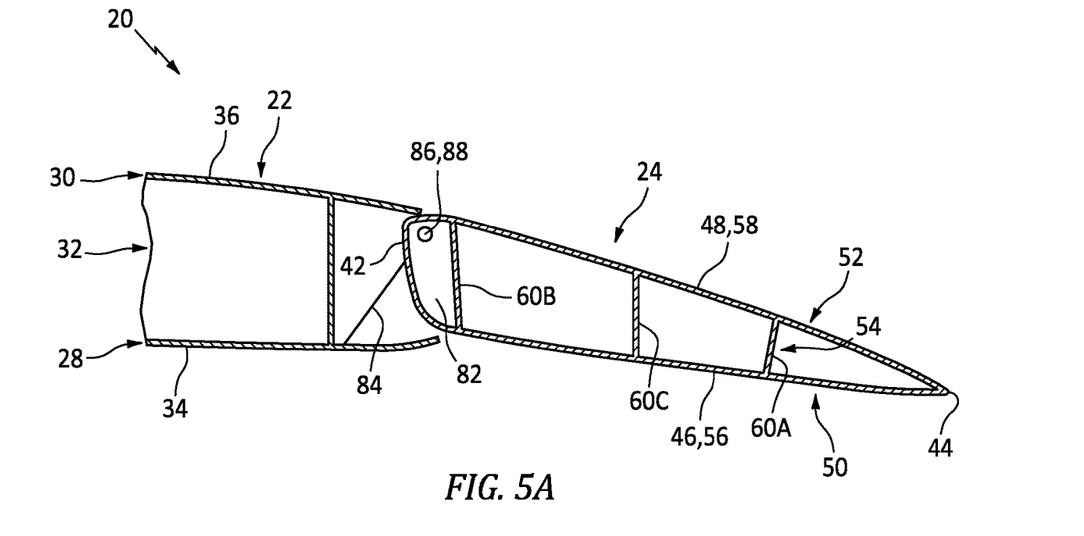
FIG. 5A is a sectional illustration of a portion of the aircraft assembly with its aircraft control surface in a first position.
Figure 5B:
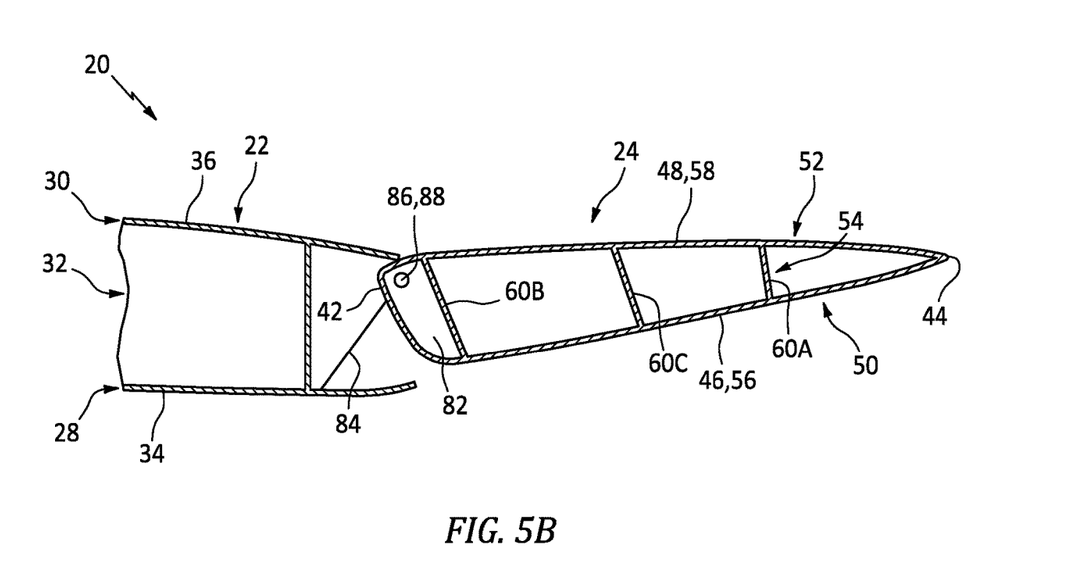
FIG. 5B is a sectional illustration of a portion of the aircraft assembly with its aircraft control surface in a second position.

Referring to FIGS. 5A and 5B, the aircraft control surface 24 is moveably coupled with the aircraft base structure 22. The aircraft control surface 24 of FIG. 2, for example, includes one or more control surface mounts 82 (e.g., hinge mounts) arranged spanwise along the base end spar 60B. Each of these control surface mounts 82 is longitudinally abutted against the base end spar 60B and a respective one of its segments 64. Each of the control surface mounts 82 is connected to the aircraft control surface 24. Each control surface mount 82, for example, may be mechanically fastened and/or bonded to one or more of the control surface elements 50, 52, 60B and/or 64.

Each control surface mount 82 of FIGS. 5A and 5B is pivotally connected to a respective base structure mount 84 (e.g., a hinge mount) of the aircraft base structure 22 through a pivot connection 86; e.g., a pin connection. The aircraft control surface 24 may thereby pivot about a control surface pivot axis 88 between a first position of FIG. 5A and a second position of FIG. 5B, or any intermediate position therebetween. The control surface pivot axis 88 may be arranged at the control surface base 42 and the control surface top skin 52.

Referring to FIG. 1, each actuation apparatus 26 may be configured as or otherwise include a linear actuator 90; e.g., a hydraulic actuator. The actuation apparatus of FIG. 1, for example, includes a housing 92 (e.g., a cylinder), a piston 94 and a driver 96 (e.g., a fixed length shaft such as a tie rod). The housing 92 is disposed at a control surface end 98 of the respective linear actuator 90. The piston 94 is arranged within an internal cavity 100 of the housing 92. This piston 94 is movable (e.g., translatable) within the housing 92 and its internal cavity 100 along an axial centerline 102 of the respective linear actuator 90. The driver 96 is connected to the piston 94. The driver 96 projects axially out from the piston 94 along the axial centerline 102 to a distal end 104 of the driver 96 at a base structure end 106 of the respective linear actuator 90.

The actuation apparatus 26 and its linear actuator 90 of FIG. 1 are movably coupled with the aircraft base structure 22 and the aircraft control surface 24. The driver 96 of FIG.

1, for example, is pivotally attached to a (e.g., stationary) mount 108 (e.g., a clevis) of the base structure support structure 32 at the base structure end 106 through a pivot connection 110; e.g., a pin connection. The housing 92 of FIG. 1 is pivotally attached to a respective actuator mount 112 (e.g., a clevis) at the control surface end 98 through a pivot connection 114; e.g., a pin connection. The linear actuator 90 and its housing 92 may thereby pivot about an actuator pivot axis 116 between a first position (e.g., see position of FIG. 5A) and a second position (e.g., see position of FIG. 5B), or any intermediate position therebetween.

The actuator pivot axis 116 of FIG. 1 is longitudinally and laterally offset from the control surface pivot axis 88 (see also FIGS. 5A and 5B). The actuator pivot axis 116 of FIG. 1, in particular, is longitudinally recessed into the aircraft control surface 24 from the control surface pivot axis 88. Each respective actuator mount 112 of FIG. 2, for example, is longitudinally recessed into the aircraft control surface 24 from the control surface mounts 82. More particularly, each actuator mount 112 of FIG. 3 is mated with (e.g., disposed within) a respective one of the actuator receptacles 80 between a respective set of the spanwise opposing stiffeners 62A and 62C, 62B and 62D. Referring to FIG. 4, each actuator mount 112 is connected to the aircraft control surface 24. Each actuator mount 112, for example, may be mechanically attached and/or bonded to one or more of the control surface elements 50, 52 and/or 60C.

With the foregoing arrangement, each actuation apparatus 26 and its linear actuator 90 is (e.g., partially or completely) disposed within a respective one of the actuator receptacles 80. This may reduce complexity and/or weight of the aircraft assembly 20 as compared to another system where an actuator is outside of an aircraft control surface. Arranging, locating, embedding the actuation apparatuses 26 and their linear actuators 90 into the aircraft control surface 24 may facilitate providing the aircraft base structure 22 and/or the aircraft control surface 24 with smaller dimensions and, thus, a more compact and/or lightweight form. Furthermore, openings in the base end spar 60B of FIG. 3 are boxed in by the elements 60C and 62A-D forming each actuator receptacle 80. The actuator receptacle elements 60C and 62A-D may thereby maintain or increase structural integrity of the aircraft control surface 24 about the actuator mounts 112.

Figure 6:
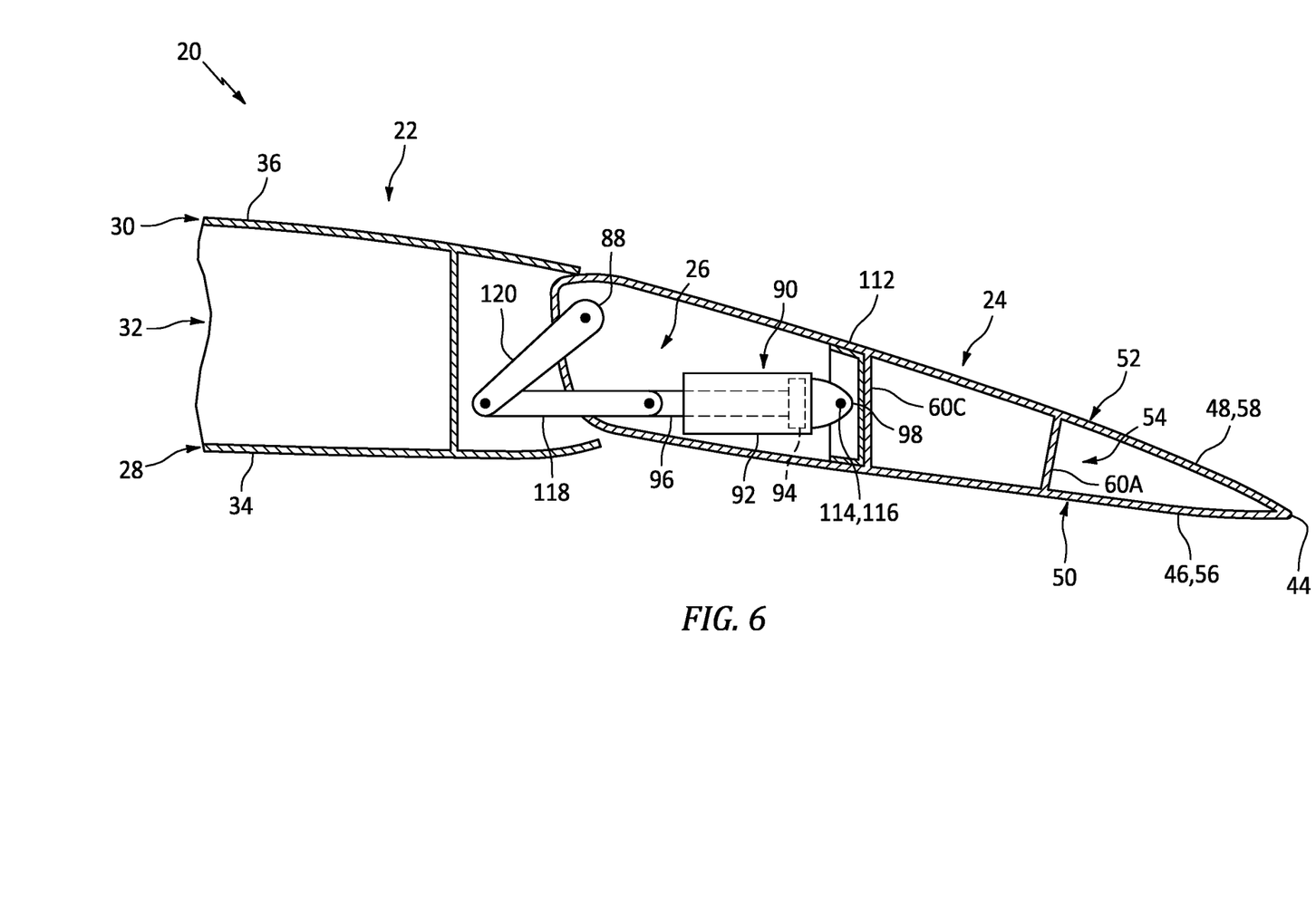
FIG. 6 is a diagrammatic illustration of a portion of the aircraft assembly with multiple linkages coupled to a linear actuator.

In some embodiments, referring to FIG. 6, one or more or all of the actuation apparatuses 26 may each further include one or more linkages for motively coupling the linear actuator 90 and its driver 96 to another component; e.g., the aircraft base structure 22. The actuation apparatus 26 of FIG. 6, for example, includes a link arm 118 (e.g., a tie rod) and a crank arm 120. The link arm 118 is between and is pivotally coupled to the driver 96 and the crank arm 120. The crank arm 120 may be fixedly attached to, for example, the aircraft base structure 22 through a shaft. With such an arrangement, at least the link arm 118 is movable relative to the aircraft base structure 22 and the aircraft control surface 24 during actuation apparatus operation.

In some embodiments, the aircraft control surface 24 may be constructed from a composite material; e.g., a fiber-reinforced composite material. The aircraft control surface 24 of FIG. 2 and its elements 50, 52 and 54, for example, may be constructure from fiber-reinforcement (e.g., carbon fibers, fiberglass fibers and/or aramid fibers) with a polymer matrix (e.g., thermoset and/or thermoplastic). In some embodiments, the aircraft control surface 24 may be constructed as a monolithic body. In other embodiments, one or more portions of the aircraft control surface 24 may be separately formed and subsequently attached (e.g., bonded) together.

The aircraft assembly 20 is described above using the terms bottom and top with reference to the orientation in the drawings for ease of description. The aircraft assembly 20 of the present disclosure, however, is not limited to any particular spatial orientations relative to gravity. For example, in other embodiments, the skin 50 may be gravitationally above the skin 52. In still other embodiments, the skins 50 and 52 may be gravitationally next to each other; e.g., the aircraft assembly 20 of FIG. 1 may be rotated ninety degrees.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft, comprising:
   an aircraft control surface including a first skin, a second skin and a support structure laterally between and connected to the first skin and the second skin;
   the support structure including a spar, a first stiffener and a second stiffener, the spar extending spanwise within the aircraft control surface, the first stiffener extending longitudinally within the aircraft control surface to the spar, and the second stiffener extending longitudinally within the aircraft control surface to the spar; and
   an actuator receptacle projecting longitudinally into the aircraft control surface from a base of the aircraft control surface to the spar, the actuator receptacle extending spanwise within the aircraft control surface between the first stiffener and the second stiffener.

2. The assembly of claim 1, wherein the actuator receptacle extends laterally within the aircraft control surface between the first skin and the second skin.

3. The assembly of claim 1, further comprising an actuator mount disposed within the actuator receptacle and connected to the aircraft control surface.

4. The assembly of claim 3, wherein the actuator mount is connected to the spar.

5. The assembly of claim 3, wherein the actuator mount is connected to at least one of the first skin or the second skin.

6. The assembly of claim 3, further comprising a linear actuator disposed in the actuator receptacle and pivotally attached to the actuator mount.

7. The assembly of claim 3, further comprising:
   a control surface mount connected to the support structure;
   a pivot axis of the actuator mount longitudinally offset from a pivot axis of the control surface mount.

8. The assembly of claim 7, wherein the pivot axis of the actuator mount is laterally offset from the pivot axis of the control surface mount.

9. The assembly of claim 1, further comprising a linear actuator disposed in the actuator receptacle and pivotally attached to the aircraft control surface.

10. The assembly of claim 9, wherein the linear actuator comprises a hydraulic actuator.

11. The assembly of claim 9, further comprising:
an aircraft base structure;
the aircraft control surface pivotally attached to the aircraft base structure at a first pivot axis; and
the linear actuator pivotally attached to the aircraft control surface at a second pivot axis that is recessed into the aircraft control surface from the first pivot axis.

12. The assembly of claim 9, further comprising:
an aircraft base structure;
the aircraft control surface pivotally attached to the aircraft base structure at a first pivot axis; and
the linear actuator pivotally attached to the aircraft control surface at a second pivot axis that is longitudinally and laterally offset from the first pivot axis.

13. The assembly of claim 1, wherein
the support structure further includes a third stiffener and a fourth stiffener;
the third stiffener extends longitudinally within the aircraft control surface to the spar;
the fourth stiffener extends longitudinally within the aircraft control surface to the spar; and
a second actuator receptacle projects longitudinally into the aircraft control surface from the base to the spar, and the second actuator receptacle extends spanwise within the aircraft control surface between the third stiffener and the fourth stiffener.

14. The assembly of claim 1, wherein
the support structure further includes a segmented spar longitudinally spaced from the spar, and the segmented spar includes a first spar segment and a second spar segment spanwise spaced from the first spar segment;
the first stiffener extends longitudinally between the first spar segment and the spar; and
the second stiffener extends longitudinally between the second spar segment and the spar.

15. The assembly of claim 1, wherein the support structure further includes a second spar longitudinally between the spar and a tip of the aircraft control surface.

16. The assembly of claim 1, wherein the aircraft control surface comprises an aileron.

17. The assembly of claim 1, wherein the aircraft control surface comprises fiber-reinforced composite material.

18. An assembly for an aircraft, comprising:
an aircraft control surface extending spanwise between a first end and a second end, the aircraft control surface extending longitudinally between a base and a tip, the aircraft control surface extending laterally between a first side and a second side that meets the first side at the tip, and the aircraft control surface comprising a first actuator receptacle and a second actuator receptacle;
each of the first actuator receptacle and the second actuator receptacle projecting partially longitudinally into the aircraft control surface from the base, each of the first actuator receptacle and the second actuator receptacle extending spanwise within the aircraft control surface, and each of the first actuator receptacle and the second actuator receptacle extending laterally within the aircraft control surface;
a first actuation apparatus mated with the first actuator receptacle and pivotally connected to the aircraft control surface; and
a second actuation apparatus mated with the second actuator receptacle and pivotally connected to the aircraft control surface.

19. The assembly of claim 18, wherein
the aircraft control surface further includes a first skin, a second skin, a spar, a first stiffener and a second stiffener;
the spar extends spanwise within the aircraft control surface;
the first stiffener extends longitudinally within the aircraft control surface to the spar;
the second stiffener extends longitudinally within the aircraft control surface to the spar; and
the first actuator receptacle is formed by the spar, the first stiffener and the second stiffener laterally between the first skin and the second skin.

20. An assembly for an aircraft, comprising:
an aircraft base structure;
an aircraft control surface pivotally attached to the aircraft base structure at a control surface pivot axis; and
an actuation apparatus comprising a linear actuator and a linkage, a first end of the linear actuator pivotally attached to the aircraft control surface at an actuator pivot axis recessed into the aircraft control surface from the control surface pivot axis, and a second end of the linear actuator pivotally attached to the linkage at a linkage pivot axis, wherein the linkage moves relative to the aircraft base structure and the aircraft control surface during operation of the actuation apparatus.

* * * * *